Oct. 3, 1939.   R. L. DAVISON   2,175,147
OUTLET-PROVIDED INTERCONNECTING UNIT
Filed May 11, 1934
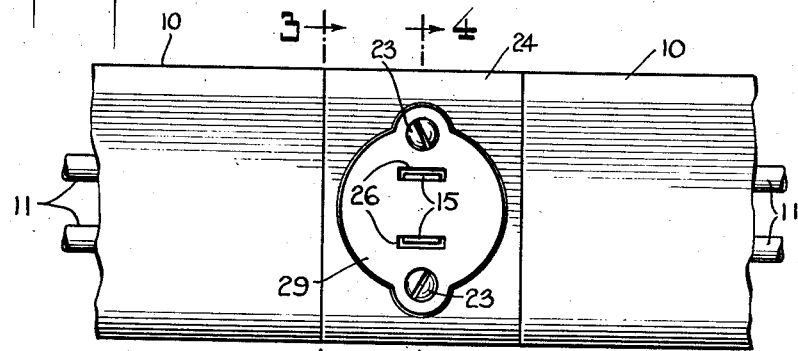
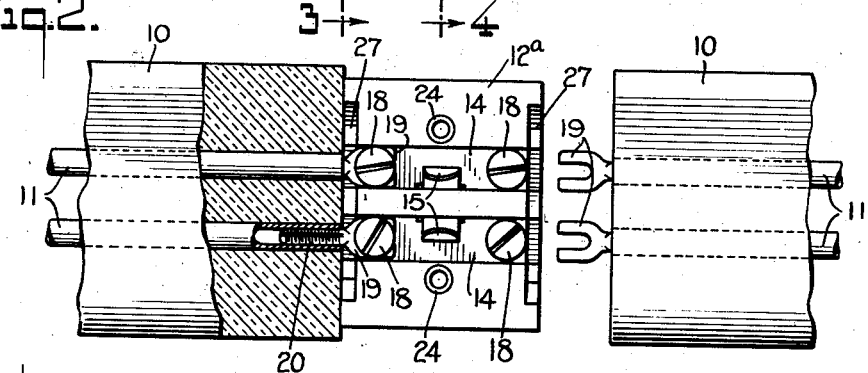
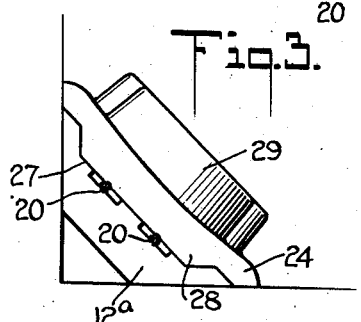
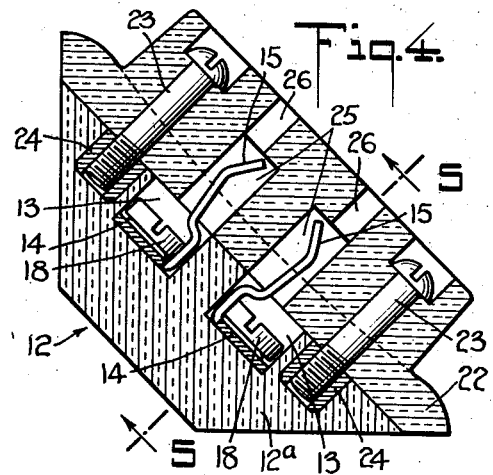
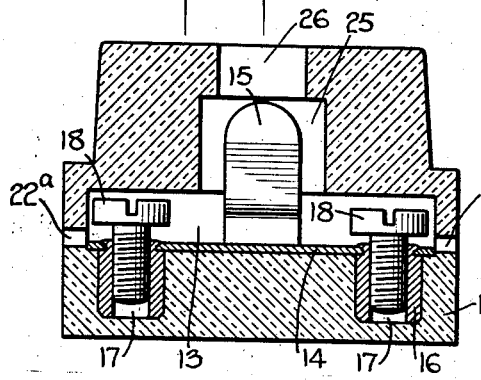
INVENTOR
Robert L. Davison
BY
HIS ATTORNEY Patented Oct. 3, 1939

2,175,147

UNITED STATES PATENT OFFICE 2,175,147

OUTLET-PROVIDED INTERCONNECTING UNIT

Robert L. Davison, New York, N. Y., assignor to John B. Pierce Foundation, New York, N. Y., a corporation of New York Application May 11, 1934, Serial No. 725,064

11 Claims. (Cl. 173—334.1)

My present invention relates to a combined interconnecting unit and outlet for use in a combined molding and electrical wiring system.

In my co-pending application, Serial No. 690,653, filed September 23, 1933, entitled Combined electric wiring and molding system, I have set forth exemplifications of molding and electrical wiring systems comprising essentially long and short units of insulating material, and simulating molding in form and appearance, hollow electrical conductors, advantageously tubes, being embedded in and extending longitudinally of the long units. Combined with these long units are short units for interconnecting the same.

In my later co-pending application, Serial No. 725,063, filed May 11, 1934, entitled Interconnecting unit construction for combined molding and electrical wiring systems, there is described and claimed improved forms of short, or interconnecting, units for use in the above and other electrical wiring systems such as are set forth and claimed in my co-pending application, Serial No. 690,653, above referred to. In such later co-pending application, Serial No. 725,063, filed May 11, 1934, I have disclosed and claimed a short, or interconnecting, unit in which a terminal connector includes a screw-threaded terminal member, preferably also fluted, serving as a means for effecting good electrical and firm mechanical connection between each tubular electric conductor embedded in a long unit and the associated conductor of the short, or interconnecting, unit.

In my present invention I have devised a combined short or interconnecting unit and outlet means, the conductors of the short or interconnecting unit being adapted for use as a connecting link between the adjacent ends of the respective tubular members of the two long units, such short, or interconnecting, unit may be employed where it is desired to connect the tubular conductors, embedded in the long units, to power leads. When, however, it is desired to tap into the tubular conductors embedded in the long units I preferably employ one of the short or interconnecting units constituting my present invention and therefore the unit of my present invention is devised as a combined electrical and mechanical connecting unit and outlet means.

Preferably I employ the same type of terminal connector as is disclosed in my aforesaid co-pending application, Serial No. 725,063, filed May 11, 1934, for connecting the usual parallelly arranged conducting members extending longitudinally of the short or interconnecting unit with the tubular conductors embedded in and extending longitudinally of the long units. This terminal connector is preferably screw-threaded at one end and is made of relatively hard conducting material, and is provided preferably also with a plurality of longitudinally extending flutes. Such construction facilitates the insertion of the threaded end within a tubular end of an adjacent conductor. The flutes combine with the screw threading to insure enhanced physical engagement and locking, effective both mechanically and electrically.

Each terminal connector is preferably of a hard, electrically conducting material, as for example, hard copper and phosphor bronze.

Therefore, a feature of my invention resides in the construction of a combined interconnecting unit and outlet for electrical wiring systems.

A feature of my invention resides in the specific construction of unitarily formed combined conducting strips and outlet elements.

It will be observed that my system is not limited to its use as a molding or trim, and may be employed as a wiring system per se constituted of the stated long units and alternately assembled short units.

A feature of my wiring system resides in the facility of positioning the one or more outlet-provided short units at the desired locations for outlet purposes, such outlet-provided short units being, if desired, installed in advance, and the system completed by assembling the long units and interconnecting short units, which last-named short units need not be provided with outlet means.

Other features and objects of the invention are more specifically pointed out as the following description of specific forms of my invention and the accompanying drawing, in which Fig. 1 is an elevation of adjacent end portions of two long units each having tubular conductors embedded therein, and with a combined connecting member and outlet embodying a preferred form of my invention interconnecting long units.

Fig. 2 is an exploded view of the structure shown in Fig. 1, one long unit being shown partly in section, the subject matter of my present invention being shown with the outlet cover thereof removed; the second long unit is shown separated from the interconnecting unit.

Fig. 3 is an elevation on the line 3—3 of Fig. 1.

Fig. 4 is a sectional elevation on the line 4—4 of Fig. 1 or an enlarged scale.

Fig. 5 is a section on the line 5—5 of Fig. 4.

Fig. 6 is a side elevation of the threaded terminal connector.

Referring to the drawing, 10 designates a long unit, two such units being shown in Fig. 1. Each long unit may be formed of insulating material, to have the form, shape and appearance of molding, such as floor molding, ceiling molding, picture molding, rail molding, etc.

Each long unit has embedded and suitably spaced therein tubular conductors 11, electrically insulated from each other and arranged parallel to one another.

The short or interconnecting unit 12, shown in the drawing, embodies a base 12a having the contour, that is, shape and form in cross section corresponding to the contour of the long unit 10, as appears from Figs. 3 and 4. Preferably, I form in the upper or outer face of the base 12, and parallel to but spaced apart from one another, longitudinally extending grooves 13, and in such grooves are suitably mounted the conducting strips 14 of suitable conducting material.

The outlet means is associated with the conductors of the short or interconnecting unit, in any suitable manner.

Preferably, I associate the electrical terminals of the outlet means with the conductors as a unitary assembly, to afford the mounting of the assembly as a unit on the base of the short or interconnecting unit.

Pursuant to the preferred form illustrated in the drawing, the outlet terminals 15, 15 are integral with the respective conductors 14, 14 as by blanking and forming, and respectively mounted on the base 12a by the provision of an anchor post 16.

It is commercially economical to form the base 12a of a moldable material, and to mold the anchor posts 16 therein.

Advantageously, such anchor post mounting is utilized dually for the securement of a terminal member, for interconnection with the associated tubular conductor 11 of the adjacent long unit 10, as by tapping i. e. screw-threading the inner cylindrical wall 17 of each bushing 16, to receive the set screw 18 or equivalent for securement of a terminal member.

A preferred form of my terminal member, see Figs. 2 and 5, comprises a length of suitable electrically conducting material such as a blank of suitably hardened metal, viz. phosphor-bronze, flattened at one end 19 and its opposite end 20 of general cylindrical contour and screw-threaded, the end 20 preferably has a terminal portion of general frusto-conical contour to facilitate insertion without the end of the conductor 11. The external diameter of the screw-threaded end 20 is slightly greater than the internal diameter of the tubular conductor 11. When the end 20 is inserted within the terminal portion of a tubular conductor and pressure applied, its screw-threading bites into the inner wall of the tubular conductor.

Most preferably, the screw threading is of non-continuous character as by the provision of flutes 21 which may extend longitudinally of the cylindrical end 20. A preferred mode of insertion of the end 20 into the terminal portion of its associated tubular conductor of the adjacent long unit is to locate the flat end 19 of the terminal member in flat-wise relation to its conductor 14 of the interconnecting short unit. However, such flat-wise positioning may be but approximate since the tightening of the set screw 18 and its engagement with the flat end 19 of the terminal member automatically locates such flat end 19 in flatwise engagement with the connected conductor 14.

Preferably, the flat end 19 is of a fork formation, to provide areas of contact on opposite sides of the threaded body of each set-screw 18, jointly with its head and with the associated flat conductor 14.

As appears from the above, it is advantageous to locate the anchoring posts 16 adjacent the ends of each conductor 14, and in turn to locate such posts adjacent the end of the short unit 12.

The short unit is completed with respect to its face and its outlet means by the provision of a cap or cap portion 22, which may be secured to the base in any suitable manner, as by means of screws 23 and tapped members 24. Such members 24 may be molded within or otherwise secured to the base of the short unit 12. The cap 22 may be of any desired contour.

The screws 23 are preferably located in countersunk openings 25 of the cap 22, as appears in Figs. 1 and 4.

Suitable provision is made for housing the outlet terminals 15, as by molding or otherwise forming each opening 25 housing a terminal 15 of enlarged inner dimension and having a reduced outer portion 26, see Figs. 4 and 5.

The opposite ends of the cap 22 are slotted or cut away to provide openings 22a for the passage therethrough of the ends 19 of the respective connecting members.

The cap 22 may be of any desired design. Preferably the cap is designed for minimum conspicuousness.

Electrical power is supplied to the conductors by any suitable means as will be understood by those skilled in the art. Preferably, as is set forth in my co-filed and co-pending application Serial No. 725,063, electrical power lines are connected by conductors passing through suitable opening means at an unexposed face in a short unit and suitably connected to the respective body portions of such short unit.

From the above it appears that my invention provides for an outlet-provided unit serving to interconnect adjacent long units, the short unit having a construction of improved characteristics and of low cost of material and production. In particular, my invention provides for dually mechanically and electrically connecting elements of rugged character, insuring reliable mechanical connection as well as good electrical engagement of the electrical parts.

My invention provides also an assembly of long and short units to be installed in close physical end to end relation to one another, and the eventual electrical and mechanical interconnection effected by the employment of connecting elements separate from the conductors per se, which are located by mere insertion and twisting of one end namely, within the associated tubular conductor of the long unit and securement by means of a set screw or equivalent, namely, to complete its connection with the associated conductor of the short unit. Such assembly has corresponding advantage in the event of disconnection when desired of any short unit, as for example when replacing an outlet-provided short unit by a short unit not provided with outlet means, or under other circumstances.

Whereas I have described my invention by reference to specific forms thereof, it will be understood that many changes and modifications may be made without departing from the spirit of the invention.

I claim:

1. The combination with a long unit having tubular conductors insulatedly embodied therein, the terminals of said tubular conductors being substantially flush at the opposite ends of said long unit, of a short unit, conductors insulatedly carried by the body of such short unit, and connecting means for interconnecting the conductors of said short unit with the terminal portions of associated tubular conductors of the long unit, said connecting means including an element of conducting material having a generally cylindrical end for insertion within and mechanically and good electrical engagement with the tubular conductor, the opposite end of said element being adapted for connection with the associated conductor of the short unit, flexible contacts respectively connected with the conductors of said short unit, and an apertured housing for said flexible contacts secured to the body of said short unit.

2. The combination with a long unit having tubular conductors insulatedly embodied therein, the terminals of said tubular conductors being substantially flush at the opposite ends of said long unit, of a short unit, flat-ended conductors insulatedly carried by the body of such short unit, and connecting means for interconnecting the conductors of said short unit with the terminal portions of associated tubular conductors of the long unit, said connecting means including an element of conducting material having a generally cylindrical end for insertion within and mechanical and good electrical engagement with the tubular conductor, the opposite end of said element being flattened for connection with the associated conductor of the short unit, flexible contacts respectively connected with the conductors of said short unit, and an apertured housing for said flexible contacts secured to the body of said short unit.

3. The combination with a long unit having tubular conductors insulatedly embodied therein, the terminals of said tubular conductors being substantially flush at the opposite ends of said long unit, of a short unit, conductors insulatedly carried by the body of such short unit, and connecting means for interconnecting the conductors of said short unit with the terminal portions of associated tubular conductors of the long unit, said connecting means including an element of conducting material having a generally cylindrical end for insertion within and mechanical and good electrical engagement with the tubular conductor, means for securing said conductors respectively to the body of the short unit, said securing means including recessed posts, and means cooperating with said recessed posts respectively for securing the opposite end of said connecting elements to the respective conductors of said short unit, flexible contacts respectively connected with the conductors of said short unit, and an apertured housing for said flexible contacts secured to the body of said short unit.

4. The combination with a long unit having tubular conductors insulatedly embodied therein, the terminals of said tubular conductors being substantially flush at the opposite ends of said long unit, of a short unit, conductors insulatedly carried by the body of such short unit, and connecting means for interconnecting the conductors of said short unit with the terminal portions of associated tubular conductors of the long unit, said connecting means including an element of conducting material having a generally cylindrical end for insertion within and mechanical and good electrical engagement with the tubular conductor, means for securing said conductors respectively to the body of the short unit, said securing means including screw-threaded recessed posts, and screw-threaded means cooperating with said recessed posts respectively for securing the opposite end of said connecting elements to the respective conductors of said short unit, flexible contacts respectively connected with the conductors of said short unit, and an apertured housing for said flexible contacts secured to the body of said short unit.

5. The combination with a long unit having tubular conductors insulatedly embodied therein, the terminals of said tubular conductors being substantially flush at the opposite ends of said long unit, of a short unit, conductors insulatedly carried by the body of such short unit, and connecting means for interconnecting the conductors of said short unit with the terminal portions of associated tubular conductors of the long unit, said connecting means including an element of conducting material having a generally cylindrical end for insertion within and mechanical and good electrical engagement with the tubular conductor, means for securing said conductors respectively to the body of the short unit, said securing means including recessed posts, and means cooperating with said recessed posts respectively for securing the opposite end of said connecting elements to the respective conductors of said short unit, said posts being respectively located adjacent the opposite ends of said short unit, flexible contacts respectively connected with the conductors of said short unit, and an apertured housing for said flexible contacts secured to the body of said short unit.

6. A combined molding and electrical wiring system comprising alternately assembled long and short conductor carrying units composed entirely of insulating material, and adapted to serve as a building molding, hollow electrical conductors insulatedly embodied in each long unit having termini respectively substantially flush at each end of each long unit, said short units serving as couplings for the long units and having electrical conductors insulatedly embodied therein having termini respectively projecting at each end of each short unit and arranged to respectively engage the hollow termini of the conductors of adjacent long units, certain of said short units being provided with outlet means, the exposed faces of said long units and said short units being substantially identical in facial contour to effect visual continuity when assembled, the projecting terminal portions of the electrical conductors of certain of said short units being elements separable from their respective body portions, each element having a generally cylindrical end bearing screw-threaded faces for insertion to effect mechanical and good electrical connection within the hollow terminal portion of an associated hollow conductor, and means for securing each such element in mechanical and good electrical engagement with its body portion, certain of said outlet means of said certain outlet-means-provided short units having flexible contacts respectively extending through the outlet openings, and suitably secured to the body portion of the associated conductor of such short unit.

7. A combined molding and electrical wiring system comprising alternately assembled long and short conductor carrying units composed entirely of insulating material, and adapted to serve as a building molding, hollow electrical conductors insulatedly embodied in each long unit having termini respectively substantially flush at each end of each long unit, said short units serving as couplings for the long units and having electrical conductors insulatedly embodied therein having termini respectively projecting at each end of each short unit and arranged to respectively engage the hollow termini of the conductors of adjacent long units, certain of said short units being provided with outlet means, the exposed faces of said long units and said short units having their lateral edges in rectilinear alignment to effect visual continuity when assembled, the projecting terminal portions of the electrical conductors of certain of said short units being elements separable from their respective body portions, each element having a generally cylindrical end bearing screw-threaded faces for insertion to effect mechanical and good electrical connection within the hollow terminal portion of an associated hollow conductor, and means for securing each such element in mechanical and good electrical engagement with its body portion, certain of said outlet means of said certain outlet-means-provided short units having flexible contacts respectively extending through the outlet openings, and suitably secured to the body portion of the associated conductor of such short unit.

8. A combined molding and electrical wiring system comprising alternately assembled long and short conductor carrying units composed entirely of insulating material, and adapted to serve as a building molding, said short units serving as couplings for the long units, the conductors of said long units and said short units being in continuous conductive relationship when the units are assembled end to end, the insulation within the body of each long unit and each short unit wholly embracing the respective conductors of such unit and integrally extending from conductor to conductor of such unit, the exposed faces of said long units and said short units having their lateral edges in rectilinear alignment to effect visual continuity when assembled, one of said short units being provided with an opening at an unexposed face to afford access to the respective conductors of such unit for effecting electrical connection with the service lines, the projecting terminal portions of the electrical conductors of certain of said short units being elements separable from their respective body portions, each element having a generally cylindrical end bearing screw-threaded faces for insertion to effect mechanical and good electrical connection within the hollow terminal portion of an associated hollow conductor, and means for securing each such element in mechanical and good electrical engagement with its body portion, certain of said outlet means of said certain outlet-means-provided short units having flexible contacts respectively extending through the outlet openings, and suitably secured to the body portion of the associated conductor of such short unit.

9. The combination with a long unit having tubular conductors insulatedly embodied therein, the terminals of said tubular conductors being substantially flush at the opposite ends of said long unit, of a short unit, conductors insulatedly carried by the body of such short unit, and connecting means for interconnecting the conductors of said short unit with the terminal portions of associated tubular conductors of the long unit, said connecting means including an element of conducting material having a generally cylindrical end for insertion within and mechanically and good electrical engagement with the tubular conductor, the opposite end of said element being adapted for connection with the associated conductor of the short unit, flexible contacts respectively connected with the conductors of said short unit, and an apertured housing for said flexible contacts secured to the body of said short unit, the body of said short unit being of separable parts to afford access to said conducting element.

10. A combined molding and electrical wiring system comprising alternately assembled long and short conductor carrying units composed entirely of insulating material, and adapted to serve as a building molding, hollow electrical conductors insulatedly embodied in each long unit having termini respectively substantially flush at each end of each long unit, said short units serving as couplings for the long units and having electrical conductors insulatedly embodied therein having termini respectively projecting at each end of each short unit and arranged to respectively engage the hollow termini of the conductors of adjacent long units, certain of said short units being provided with outlet means, the exposed faces of said long units and said short units being substantially identical in facial contour to effect visual continuity when assembled, the projecting terminal portions of the electrical conductors of certain of said short units being elements separable from their respective body portions, each element having a generally cylindrical end bearing screw-threaded faces for insertion to effect mechanism and good electrical connection within the hollow terminal portion of an associated hollow conductor, and means for securing each such element in mechanical and good electrical engagement with its body portion, certain of said outlet means of said certain outlet-means-provided short units having flexible contacts respectively extending through the outlet openings, and suitably secured to the body portion of the associated conductor of such short unit, the body of said short unit being of separable parts to afford access to said element securing means.

11. A combined molding and electrical wiring system comprising alternately assembled long and short conductor carrying units composed entirely of insulating material, and adapted to serve as a building molding, hollow electrical conductors insulatedly embodied in each long unit having termini respectively substantially flush at each end of each long unit, said short units serving as couplings for the long units and having electrical conductors insulatedly embodied therein having termini respectively projecting at each end of each short unit and arranged to respectively engage the hollow termini of the conductors of adjacent long units, certain of said short units being provided with outlet means, the exposed faces of said long units and said short units having their lateral edges in rectilinear alignment to effect visual continuity when assembled, the projecting terminal portions of the electrical conductors of certain of said short units being elements separable from their respective body portions, each element having a generally cylindrical end bearing screw-threaded faces for insertion to effect mechanical and good electrical connection within the hollow terminal portion of an associated hollow conductor, and means for securing each such element in mechanical and good electrical engagement with its body portion, certain of said outlet means of said certain outlet-means-provided short units having flexible contacts respectively extending through the outlet openings, and suitably secured to the body portion of the associated conductor of such short unit, the body of said certain short unit being of separable parts to afford access to said element securing means.

ROBERT L. DAVISON.